United States Patent [19]

Komuro et al.

[11] Patent Number: 4,559,417
[45] Date of Patent: Dec. 17, 1985

[54] METHOD OF SETTING OPERATING DATA IN A KEY TELEPHONE SYSTEM

[75] Inventors: Isaku Komuro, Higashiyamato; Hideyasu Mori; Yoshikazu Sano, both of Hino; all of Japan

[73] Assignee: Tokyo Shibaura Denki Kabushiki Kaisha, Kawasaki, Japan

[21] Appl. No.: 530,266

[22] Filed: Sep. 8, 1983

[30] Foreign Application Priority Data

Sep. 18, 1982 [JP] Japan .................................. 57-162917

[51] Int. Cl.[4] .......................... H04Q 5/00; H04M 1/00
[52] U.S. Cl. .............................. 179/99 LS; 179/99 R; 179/84 L
[58] Field of Search ............ 179/99 LS, 99 R, 90 BB, 179/90 BD, 90 K, 81 R, 81 C, 84 L, 99 LC, 99 M, 18 B, 18 AD; 340/825.17, 825.15, 825.22

[56] References Cited

U.S. PATENT DOCUMENTS

| | | | |
|---|---|---|---|
| 4,196,316 | 4/1980 | McEowen et al. | 179/18 ES |
| 4,203,011 | 5/1980 | Coviello | 179/99 M |
| 4,291,199 | 9/1981 | Densmore et al. | 179/18 AB |
| 4,453,040 | 6/1984 | Wolf et al. | 179/81 C |
| 4,491,693 | 1/1985 | Sano et al. | 179/99 R |
| 4,517,409 | 5/1985 | Nagasaki | 179/81 C |
| 4,520,235 | 5/1985 | Morikawa et al. | 179/99 LS |

FOREIGN PATENT DOCUMENTS

| | | | |
|---|---|---|---|
| 0043896 | 4/1981 | Japan | 179/99 R |
| 0050853 | 3/1983 | Japan | 179/99 R |

OTHER PUBLICATIONS

Ikawa et al., "A Large Scale TDM Electronic Key Telephone System", Intelcon 79 Exposition Proceedings, Dallas, Tex. 2-26-79.

Kopec et al., *World-Wide Communications Journal,* "Electronic Business Telephone", vol. 18, No. 2, Mar. 1980, pp. 34-40.

*Primary Examiner*—Thomas W. Brown
*Assistant Examiner*—Elio DiVito
*Attorney, Agent, or Firm*—Banner, Birch, McKie & Beckett

[57] ABSTRACT

A method of setting operating data is provided wherein a display, at a predetermined key telephone set, indicates the capabilities of all sets of the system to perform the various functions of which the system's key telephones are capable. The display indicates three conditions: whether all telephones are capable of performing the indicated function, whether no telephones are capable of performing the function, or whether at least one but not all telephones are so capable. The setting of operating data is facilitated by this display. Changes made in operating data are not permanent until a setting key is depressed. Before that, the original operating data may be recovered.

9 Claims, 9 Drawing Figures

LEGEND

METHOD OF SETTING OPERATING DATA IN A KEY TELEPHONE SYSTEM

SUMMARY OF THE INVENTION

One object of the present invention is to provide a method of setting operating data in a key telephone system wherein data is easily set by an operator.

Another object is to provide such a method in which, for each function available to the key telephones, a display can show whether all telephones are capable of performing the function, whether none are capable of performing the function, or whether at least one but not all of the telephones are so capable.

Another object is to provide such a method in which original operating data which has been changed may easily be recovered.

In the present invention, a predetermined key telephone set is used to set operating data in all of the key telephone sets. Data setting is done in one of two modes: for all sets at once ("all sets mode") or for each set individually ("each set mode").

For "each set mode," operating data may be set for each telephone set in the system, from the predetermined key telephone set. The desired telephone set is selected, and its current operating data is displayed at the predetermined telephone set. The display indicates one of two conditions for each function available to the system's telephone sets: whether the selected set is capable of performing the function or whether it is not. In order to change the capability of the selected set to perform various functions, keys on the predetermined set are pressed, followed by pressing a setting key to set the changed operating data.

For "all sets mode," operating data may be set for all telephone sets at once from the predetermined key telephone set. Current operating data for all sets is displayed, indicating one of three conditions for each function: whether all sets are capable of performing the function, whether none are capable of performing the function, or whether at least one but not all of the key telephone sets are so capable. The capability of all sets to perform a given function may be changed at once by pressing the appropriate keys on the predetermined key telephone set.

In each case, when operating data is being changed, it is done cyclically, that is, in a manner which enables the original operating data to be recovered. For "all sets mode," for example, when the changing keys are pressed, first all sets are made capable of performing the function, then no sets, then (if at least one but not all sets were originally able to perform the function) the original capabilities of the telephone sets are recovered, then all sets, and so on. The original data is not lost until the setting key is pressed.

DETAILED DESCRIPTION OF THE PREFERRED EMBODIMENT

Although the invention claimed herein is a method of setting data in a key telephone system, for the sake of clarity the system itself will be described first.

Figure 1:
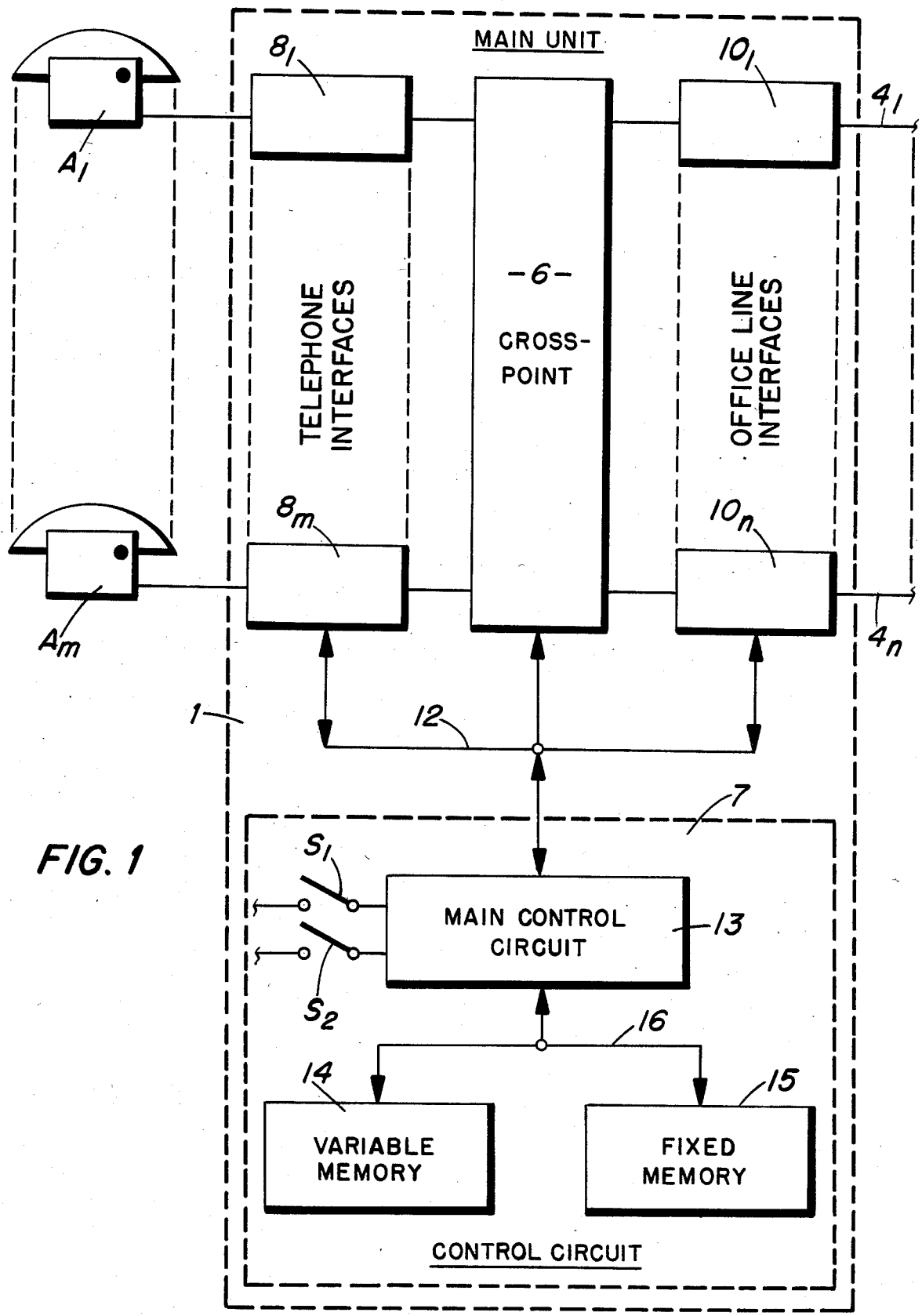
FIG. 1 is a block diagram of a key telephone system to which this invention applies.

FIG. 1 is a block diagram of a key telephone system to which this method pertains. Main unit 1 interconnects m telephone sets $A_1$-$A_m$ and n office lines for $4_1$-$4_n$. Main unit 1 comprises cross-point 6, control circuit 7, telephone interfaces $8_1$-$8_m$, and office line interfaces $10_1$-$10_n$. (Telephone interfaces 8 are respectively connected between cross-point 6 and telephone sets A; office line interfaces 10 are respectively connected between cross-point 6 and office lines 4.)

Cross-point 6, telephone interfaces 8, and office line interfaces 10 are connected through bus 12 to control circuit 7 and are controlled by control circuit 7. The control circuit includes main control circuit 13, variable memory 14 (for example, a random access memory—RAM), fixed memory 15 (for example, a read only memory—ROM), first switch $S_1$ and second switch $S_2$. Main control circuit 13, which performs processor functions, is connected to switches $S_1$ and $S_2$ which are manually actuated to control the respective components of main unit 1. In conjunction with switches $S_1$ and $S_2$, main unit 1 is controlled by a program stored in variable and fixed memories 14 and 15, which are connected through internal bus 16.

Variable memory 14 stores at least operating data which is referred to by main control circuit 13 during operation of the key telephone system. Second memory 15 stores reference operating data corresponding to the operating data stored in variable memory 14, a program for operating main control circuit 13 as a processor, and other data which is non-operational in nature. The reference operating data stored in advance is default data which would be satisfactory as operating data for the key telephone system for the majority of general purpose users.

Figure 2:
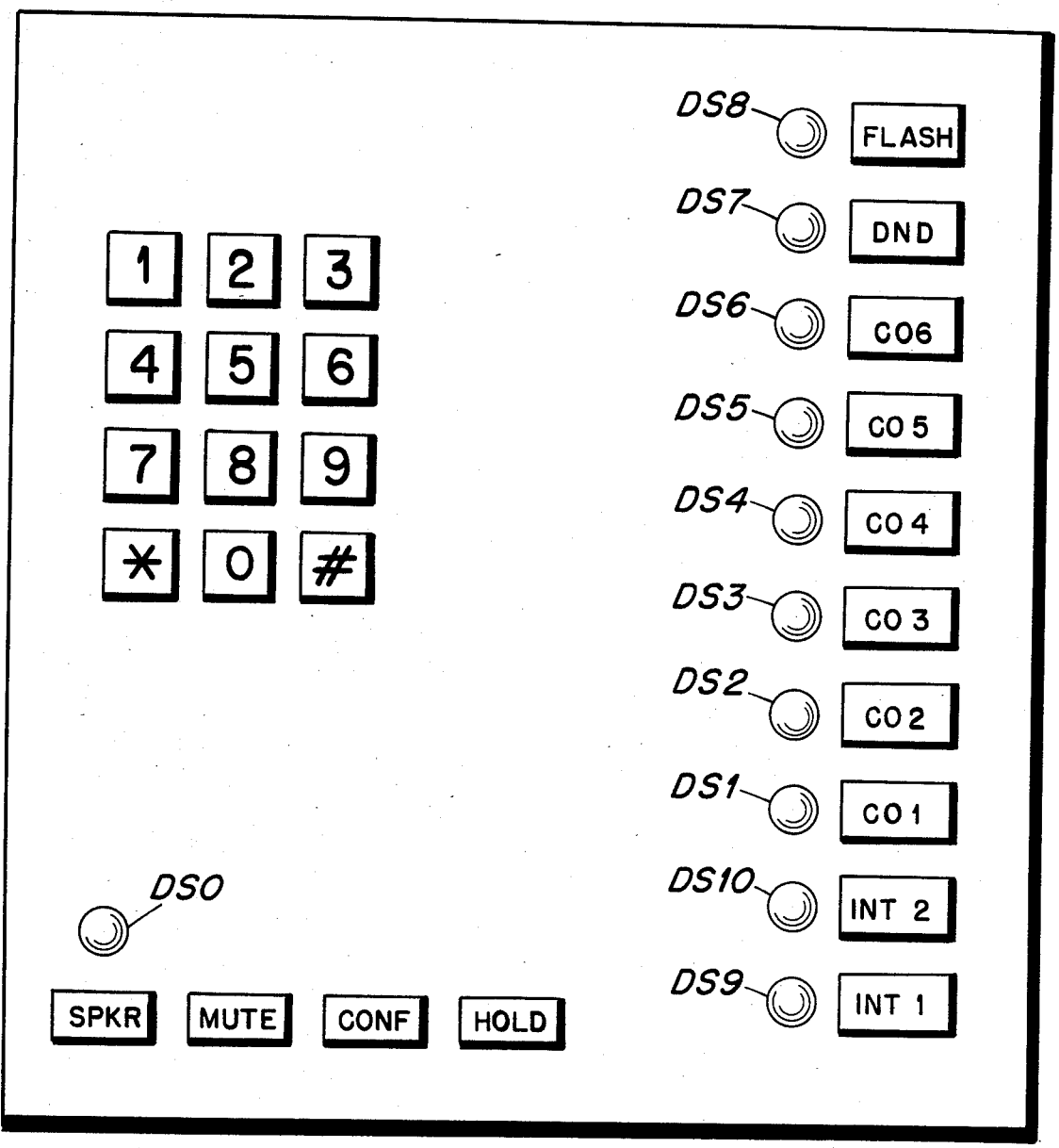
FIG. 2 is an example of the panel layout of a key telephone set.

FIG. 2 illustrates the front panel of a key telephone set A for use in this system. There are three groups of keys: the first group, which comprises numeric keys 0-9, * and #, the second group, which comprises SPKR, MUTE, CONF, and HOLD, and the third group, which comprises INT1, INT2, CO1-CO6, DND, and FLASH. Also included on the front panel are indicators $DS_0$, located near the SPKR key, and $DS_1$ through $DS_{10}$, located near the third group of keys. Indicators DS may be, for example, light-emitting diodes (LEDs).

The first group of keys functions in the conventional manner with which telephone users are familiar. Functions of the second and third groups of keys are described in table 1 below.

TABLE I

| KEY | FUNCTION |
| --- | --- |
| SPKR | Hands-Free calling |
| MUTE | Inhibiting microphone operation |
| CONF | Releasing privacy between specific telephone sets |
| HOLD | Temporarily disconnecting the selected office line |

TABLE I-continued

| KEY | FUNCTION |
|---|---|
| INT1, INT2 | Selecting extension |
| CO$_1$-CO$_6$ | Selecting office line |
| DND | Inhibiting ringing |
| FLASH | Disconnecting the line for a predetermined short peroid of time |

Figure 3:
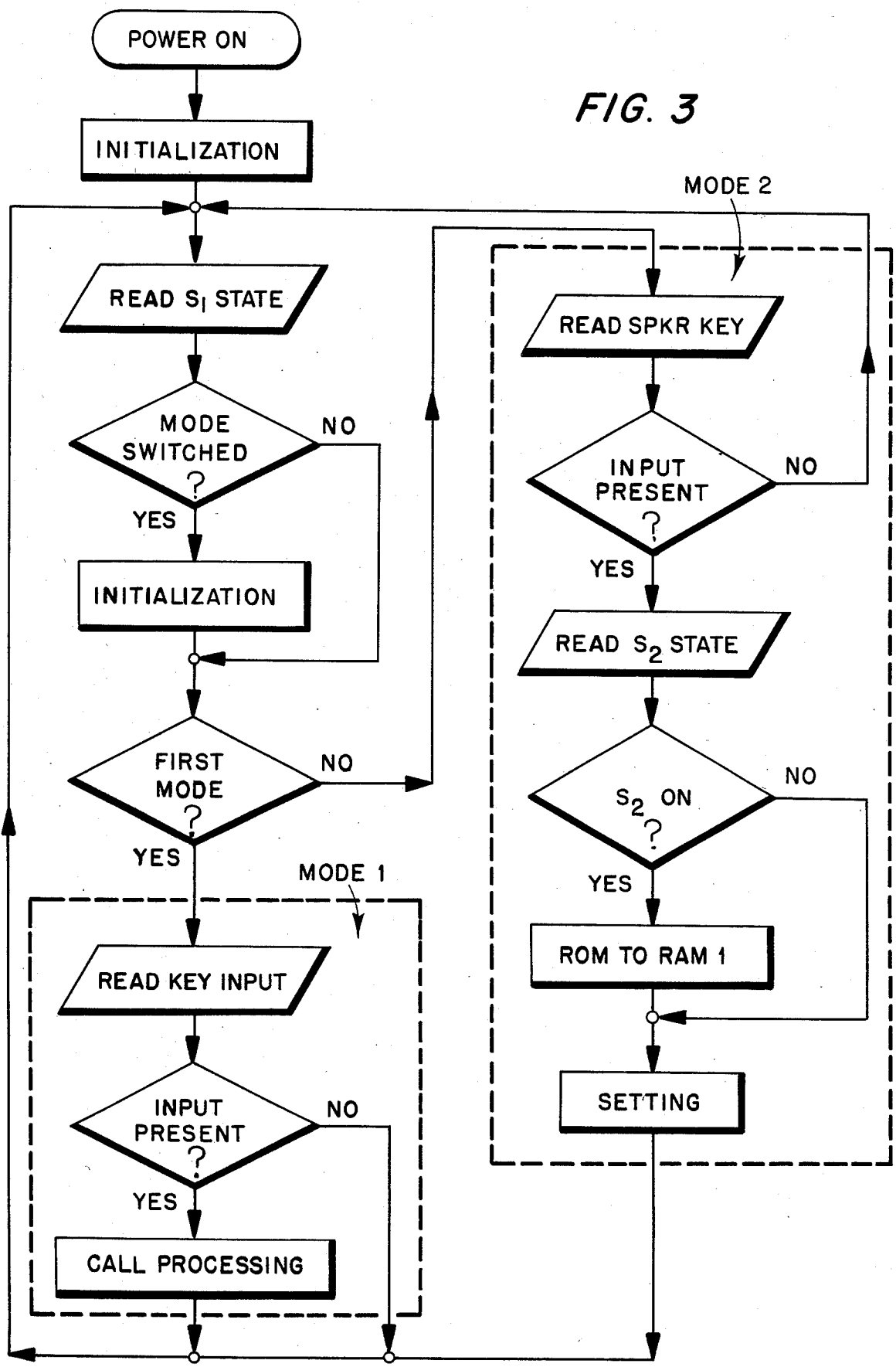
FIG. 3 is a flow chart of the overall operation of the telephone system of FIG. 1.

The key telephone system of FIG. 1 is operated as shown in the flow chart of FIG. 3. Upon the addition of power, main control circuit 13 performs a predetermined initialization routine, including the resetting of registers in main control circuit 13. At the conclusion of this routine, main control circuit 13 determines the state of switch S$_1$, identifying whether that state has changed since the previous determination. If it has, the initialization routine is performed again, resetting the contents of the registers and flags used previously by main control circuit 13 and disconnecting the lines of the respective key telephone sets so as to provide a new operating mode.

The next step is to determine which operating mode has been set by switch S$_1$. If the switch is off, the first mode has been selected, which is the normal operating mode. When an operator desires to set the operating data in the key telephone system, he switches S$_1$ on, selecting the second operating mode, which is the data setting mode.

If mode 1 has been selected, main control circuit 13 reads any key inputs from the connected key telephone sets and, if there are any, performs the necessary steps to process calls being sent or received. If no key inputs are present, the program returns to the step of determining the state of switch S$_1$.

If switch S$_1$ is turned on, indicating that the operator has selected the second, or data setting, mode, main control circuit 13 then determines whether an input is present at the SPKR key. If the SPKR key has not been depressed, the program returns to the step of checking the state of S$_1$.

If there is an input present at the SPKR key, main control circuit 13 then determines the state of switch S$_2$ in order to decide whether the operator wishes to have reference operating data transferred from fixed memory 15 to variable memory 14.

As noted above, this reference operating data is sufficient to place the key telephone system in operation and satisfy a variety of general users. If, however, in certain cases this data is unsatisfactory, it may be changed in the next program step. After the desired operating data has been set in variable memory 14, the program returns to the step of determining the state of switch S$_1$.

The operating data used by the key telephone system includes an identification of certain functions which can be performed by some or all of the key telephone sets. The sets can be individually or collectively registered to be capable or incapable of performing the various functions. For example, all sets are usually registered to inhibit ringing, that is, so that their ringing circuits can be deactivated. Not all sets, however, need be registered to originate outgoing calls to a given office line. Other data stored in variable memory 14 includes the number of telephone sets (here, 10) and the number of office lines (here, 6). For convenience in setting the operating data, in the preferred embodiment the various functions are organized in groups of 6.

Table 2 gives some examples of operating data for the key telephone system. A "0" identifies a function for which the indicated telephone set is not registered; while a "1" identifies those functions for which the sets are registered. Table 3 gives an example of the specific functions listed in Table 2 along with the key which must be actuated to register a telephone set for the function and the indicator DS which indicates that a telephone set has or has not been registered for that function.

TABLE 2

| GROUP | FUNC-TION | TELEPHONE SETS |||||||||| 
|---|---|---|---|---|---|---|---|---|---|---|---|
| | | A1 | A2 | A3 | A4 | A5 | A6 | A7 | A8 | A9 | A10 |
| 01 | 01 | 0 | 0 | 0 | 0 | 0 | 0 | 0 | 1 | 0 | 0 |
| | 02 | 1 | 0 | 0 | 0 | 0 | 0 | 0 | 0 | 0 | 0 |
| | 03 | 0 | 0 | 0 | 0 | 0 | 0 | 0 | 0 | 0 | 1 |
| | 04 | 0 | 1 | 0 | 0 | 0 | 0 | 0 | 0 | 0 | 0 |
| | 05 | 0 | 0 | 0 | 0 | 0 | 0 | 0 | 0 | 0 | 1 |
| | 06 | 1 | 1 | 1 | 1 | 1 | 1 | 1 | 1 | 1 | 1 |
| 02 | 01 | 1 | 1 | 1 | 1 | 1 | 1 | 1 | 1 | 1 | 1 |
| | 02 | 1 | 0 | 0 | 0 | 0 | 0 | 0 | 0 | 0 | 1 |
| | 03 | 1 | 1 | 1 | 1 | 1 | 1 | 1 | 1 | 1 | 1 |
| | 04 | 0 | 0 | 0 | 0 | 0 | 0 | 0 | 0 | 0 | 1 |
| | 05 | 1 | 1 | 1 | 1 | 1 | 1 | 1 | 1 | 1 | 1 |
| | 06 | 1 | 0 | 0 | 0 | 0 | 0 | 0 | 0 | 0 | 1 |

"1" registered (capable);
"0" nonregistered (incapable)

TABLE 3

| GROUP | FUNC-TION | SETTING KEY | INDI-CATOR | EXPLANATIONS |
|---|---|---|---|---|
| 01 | 01 | CO6 | DS6 | outgoing call to line 6 |
| | 02 | CO5 | DS5 | outgoing call to line 5 |
| | 03 | CO4 | DS4 | outgoing call to line 4 |
| | 04 | CO3 | DS3 | outgoing call to line 3 |
| | 05 | CO2 | DS2 | outgoing call to line 2 |
| | 06 | CO1 | DS1 | outgoing call to line 1 |
| 02 | 01 | CO6 | DS6 | paging all at once |
| | 02 | CO5 | DS5 | selecting receiving call automatically |
| | 03 | CO4 | DS4 | shortened dialing |
| | 04 | CO3 | DS3 | using microphone |
| | 05 | CO2 | DS2 | using one touch dial key |
| | 06 | CO1 | DS1 | override to secret talking |

For example, function 1 of group 1 is the ability to originate an outgoing call to office line No. 6. The "1" under A8 in Table 2 indicates that key telephone set A8 is registered to perform function 1, that is, is capable of originating an outgoing call to office line 6. It can be seen that all telephone sets are registered to perform function 6 of group 1, which is the origination of outgoing calls to office line 1.

Figure 4:
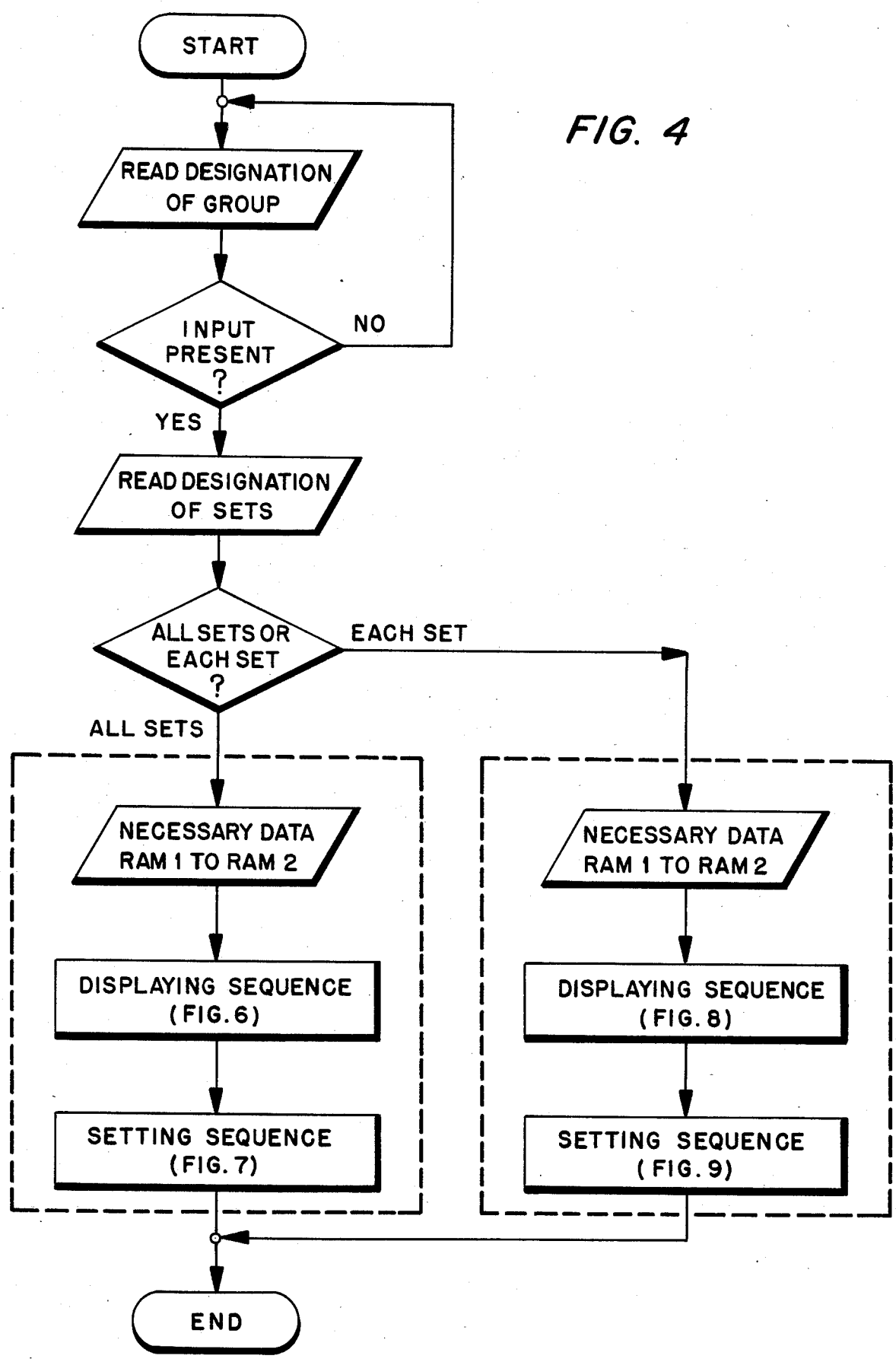
FIG. 4 is a flow chart showing the steps involved in setting operating data in the preferred embodiment of the invention.

FIG. 4 is the flow chart for the step of setting operating data in FIG. 3. Generally, the sequence involves determining whether data is to be set for all telephone sets at once or for an individual telephone set, displaying the current operating data, and setting operating data. The display and setting sequences used in setting operating data for all sets and for individual sets are shown in subsequent figures.

An operator wishing to set operating data in the key telephone system first turns switch S$_1$ on. This indicates to main control circuit 13 that operating data is to be set, as described above. The operator then inputs the desired operating data at a predetermined one of the key telephone sets A. This predetermined set need not have any special features but may be any one of the ordinary key telephone sets which has been selected for the special function of setting operating data. The operator next depresses the SPKR key, starting the operating data setting mode. Main control circuit 13 causes indicator DS1 to illuminate; and it then determines the state of switch $S_2$. If the switch is on, the reference operating data is transferred from fixed memory, that is ROM, 15 to variable memory, that is RAM, 14. This step is performed, for example, when the key telephone system is first placed in service. If swtich $S_2$ is off, of course, the contents of variable memory 14 are not replaced.

Main control circuit 13 then continues with the setting routine shown in FIG. 4. In the following example, the procedure for registering telephone sets will be described for functions in group 1, origination of outgoing calls to the various office lines. It should be understood that the procedure for registering telephones for functions in other groups is the same.

The operator depresses keys "01" to indicate which group has been selected. This input proceeds from the predetermined key telephone set A through telephone interface 8 and bus 12 to main control circuit 13. Main control circuit 13 therefore recognizes which group has been selected by the operator. If the operator then wishes to register all key telephone sets at once, he depresses some combination of keys such as "*0" by which main control circuit 13 recognizes that the setting of operating data for all sets at once is required. Selection of individual telephone sets for registration is accomplished equally easily, by other combinations of keys, such as "01" for telephone set A1, "02" for telephone set A2, and so on. A If all sets are being registered simultaneously, the operating data stored in variable memory 14 is temporarily recorded in a separate area of variable memory 14. Since the two areas of the RAM are functionally separate memories, they will be referred to as RAM 1 and RAM 2. The operating data stored in RAM 1 for all key telephone sets is therefore temporarily recorded in RAM 2.

Figure 5:
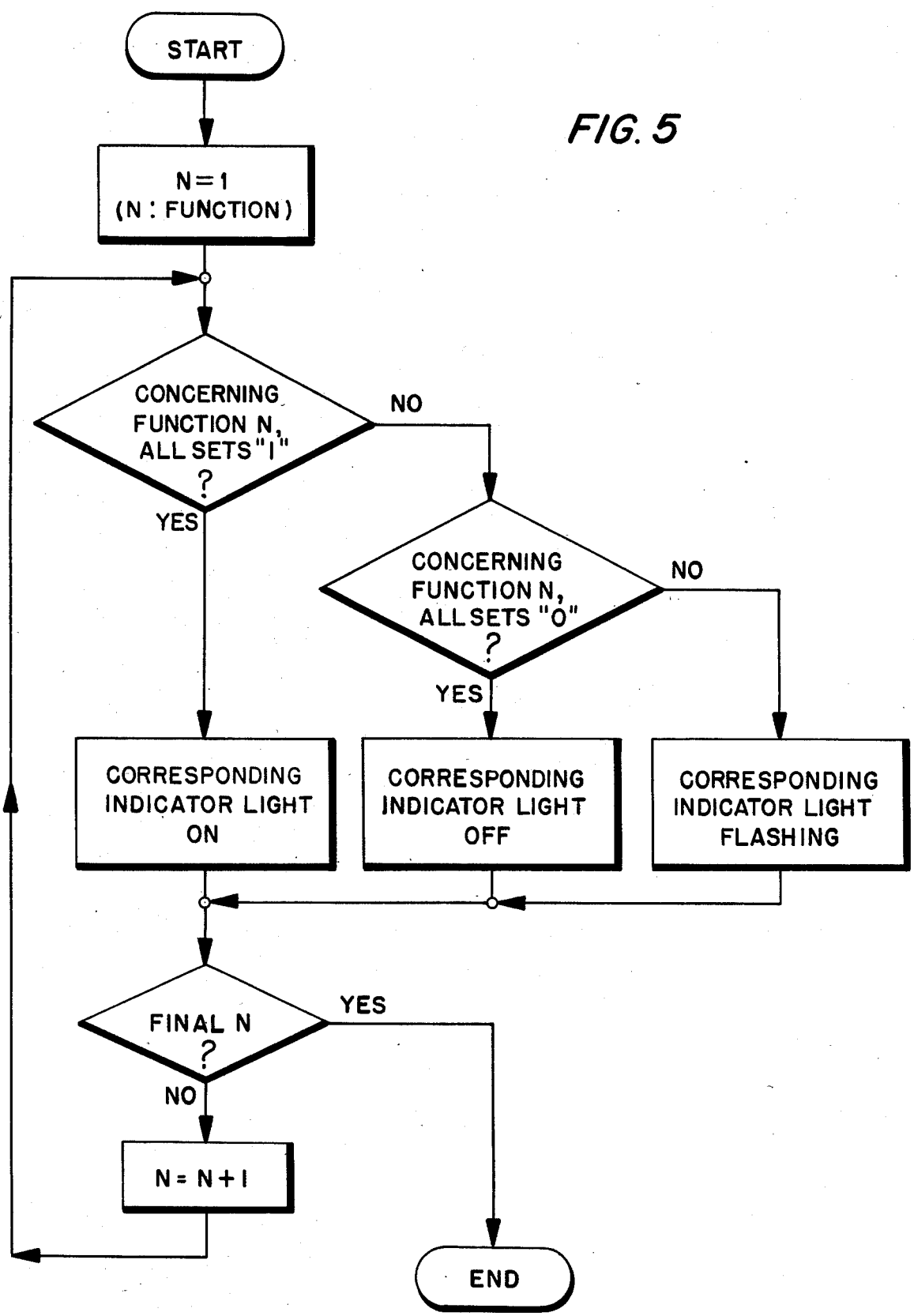
FIGS. 5-8 are detailed flow charts of parts of the flow chart of FIG. 4.

Next, the display sequence, FIG. 5, is executed. Successively for each function in group 1, main control circuit 13 determines which of the following three conditions exist: whether all key telephone sets are registered to perform the function, whether no key telephone sets are registered to perform that function, or whether at least one, but not all of the key telephone sets are registered. If the first condition exists, that is, if all of the key telephone sets are capable of performing the particular function, the indicator for that function (see Table 3) is steadily illuminated. If no key telephone set is capable of performing the function, the corresponding indicator remains off. Finally, if at least one but not all of the key telephone sets is registered to perform the function, the indicator corresponding to that function is illuminated intermittently, or flashed on and off. In this way, the operator can easily recognize, for each function, whether all sets are registered, whether no set is registered, or whether some are registered and some are not.

Figure 6:
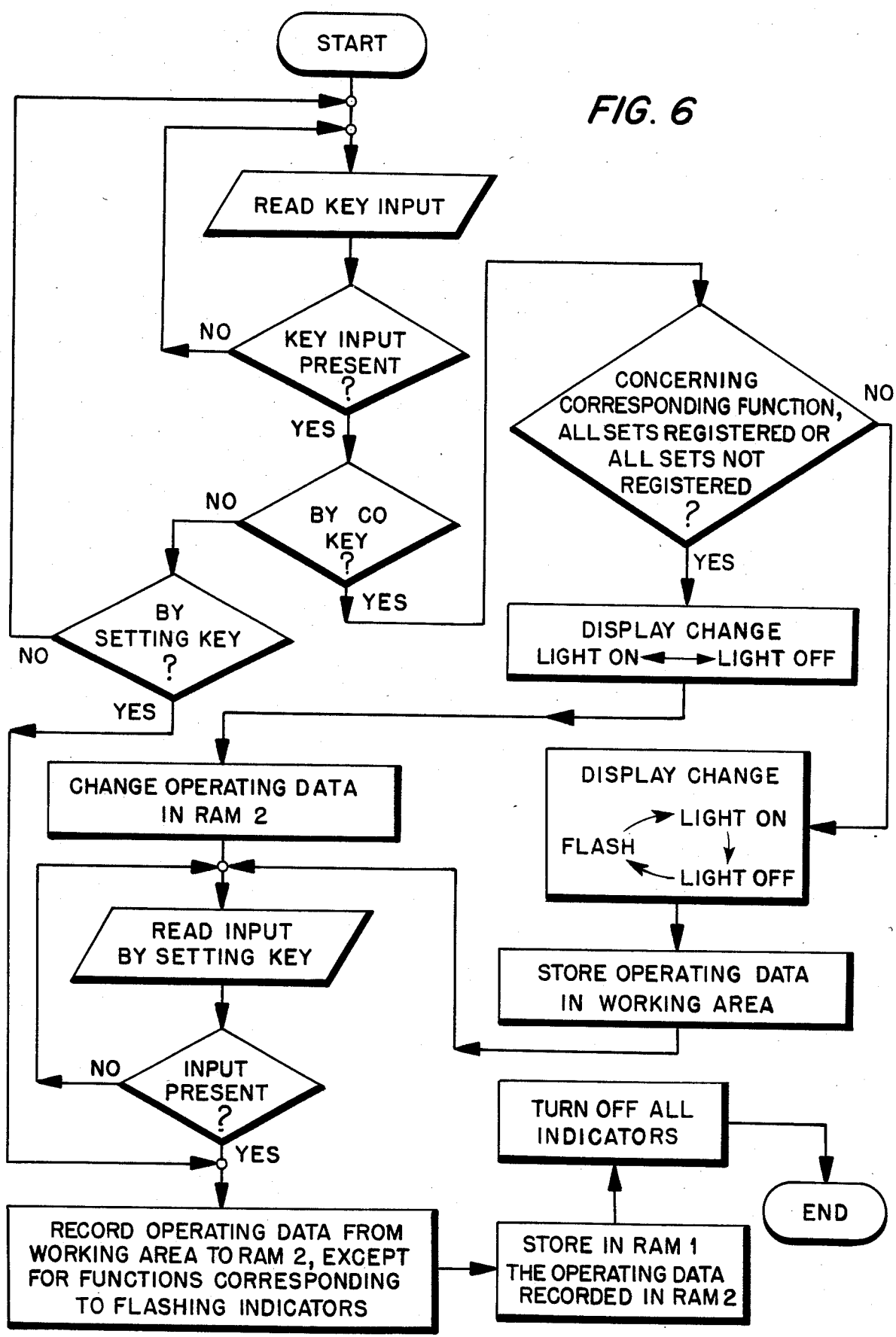

After the displaying sequence, main control circuit 13 executes the setting sequence, FIG. 6. If the data in RAM 2 is to be changed, this is done by depressing the CO keys. The relationship between the functions, indicators, and CO keys is shown in Table 3. If the indicator corresponding to a particular function is steadily illuminated, showing that all of the key telephone sets are registered to perform that function, depressing the corresponding CO key once causes the operating data in RAM 2 to be changed to indicate that registratiion of all key telephone sets for that function is cancelled; the corresponding indicator is turned off. At that time, according to the operating data in RAM 2, none of the key telephone sets is registered to perform that function. (The data in RAM 1 has not yet been changed.) The next time the same CO key is depressed, the operating data in RAM 2 is again changed to indicate that all key telephones are registered to perform the function; and the corresponding indicator is steadily illuminated. Repeated pressing of the same CO key repeats the above-described sequence. If the indicator is originally off, the process goes on in a similar manner.

On the other hand, if the indicator is originally flashing, meaning that some key telephone sets are registered to perform the function while others are not, the first actuation of the corresponding CO key causes new operating data to be stored in a third area, the working area (WA), of variable memory 14. This new operating data comprises a registration of all of the key telephone sets to perform the selected function. Consequently, the corresponding indicator is turned on. The second time the same CO key is depressed, the indicator is turned off, and the operating data in the working area is changed to indicate that none of the key telephone sets is registered to perform the selected function. The third time the CO key is depressed, no change occurs in the operating data stored in the working area, but the corresponding indicator is flashed on and off. If the CO key is again depressed, the indicator turns on steadily, and the operating data in the working area is changed to a registration of all of the key telephone sets to perform the function. Further actuations of this same CO key cause the above actions to be repeated cyclically.

After any desired changes in the operating data have been entered through the CO keys, the setting key, for example the HOLD key, is depressed in order to transfer to RAM 2 any operating data which may have been recorded in the working area of variable memory 14. No data, however, is transferred from the working area to RAM 2 for those functions whose indicators are flashing at the time the HOLD key is depressed. For these functions, the original operating data temporarily recorded in RAM 2 from RAM 1 will remain unchanged, since, by allowing the indicators to remain flashing, the operator has indicated that he does not desire either to register all of the key telephone set to perform that function or to register none of them.

Finally, the operating data in RAM 2 is stored in RAM 1 and all indicators are turned off. The setting of operating data has been completed.

Figure 9:
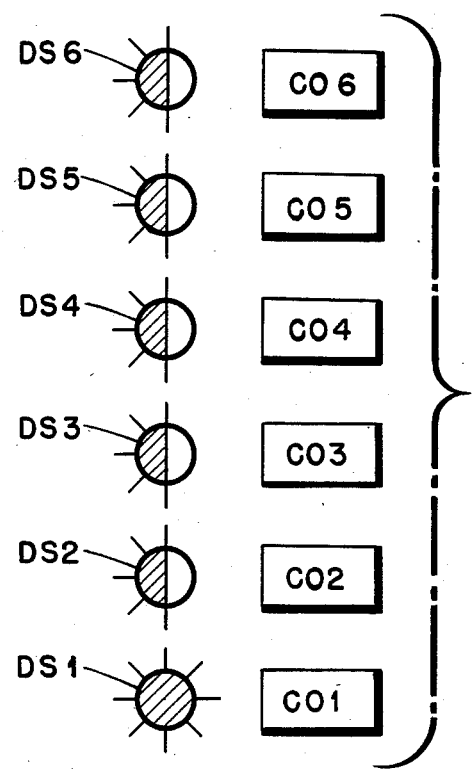
FIG. 9 shows the state of the indicators for an explanation of the flow chart of FIG. 5.
Figure 9:
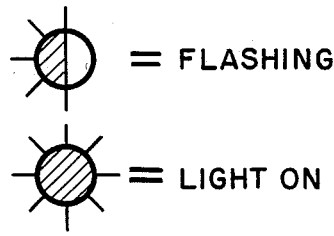

For example, if the operating data for group 1 is as shown in Table 2, it will be indicated on the front panel as illustrated in FIG. 9. If the operator enters the setting sequence in order to set operating data for all of the key telephone sets and depresses key CO5 once followed by the setting key, the operating data stored in RAM 1 will be as shown in Table 4. Clearly, the operating data for function 02 has been altered, but the operating data for other functions remains unchanged.

TABLE 4

| GROUP | FUNC-TION | TELEPHONE SETS | | | | | | | | | |
|---|---|---|---|---|---|---|---|---|---|---|
| | | A1 | A2 | A3 | A4 | A5 | A6 | A7 | A8 | A9 | A10 |
| 01 | 01 | 0 | 0 | 0 | 0 | 0 | 0 | 0 | 1 | 0 | 0 |
| | 02 | 1 | 1 | 1 | 1 | 1 | 1 | 1 | 1 | 1 | 1 |
| | 03 | 0 | 0 | 0 | 0 | 0 | 0 | 0 | 0 | 0 | 1 |
| | 04 | 0 | 1 | 0 | 0 | 0 | 0 | 0 | 0 | 0 | 0 |
| | 05 | 0 | 0 | 0 | 0 | 0 | 0 | 0 | 0 | 0 | 1 |
| | 06 | 1 | 1 | 1 | 1 | 1 | 1 | 1 | 1 | 1 | 1 |

If, after the displaying sequence, the setting key (HOLD key) rather than any of the CO keys is depressed, the operating data temporarily recorded in RAM 2 is still stored in RAM 1. However, since the operating data in RAM 2 was not altered, because no CO key was pressed, the operating data set in RAM 1 has not been changed.

Figure 7:
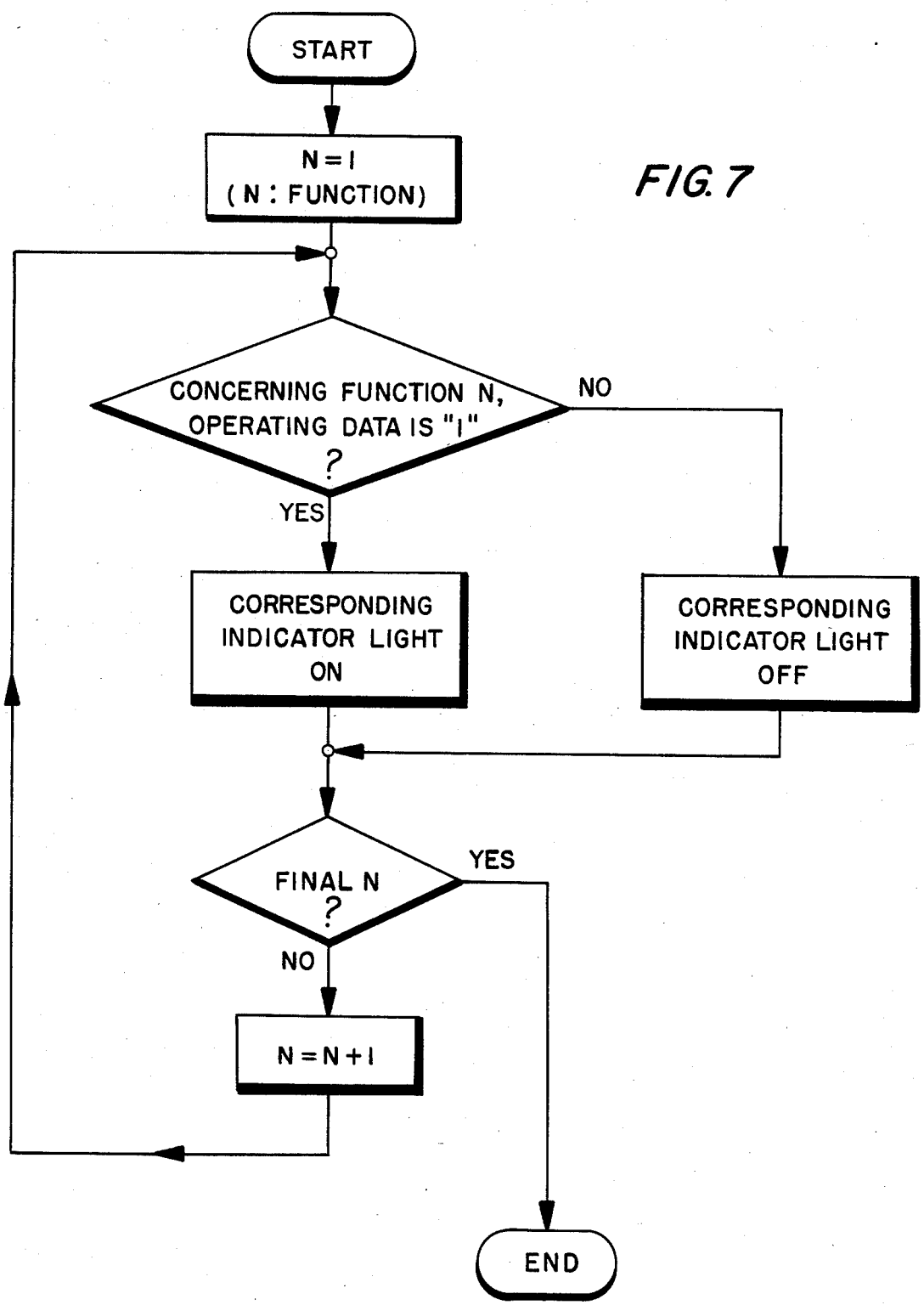

In the event operating data is to be set for only a single key telephone set, main control circuit 13 temporarily records the operating data for that particular set (selected by the operator using the telephone keys) from RAM 1 into RAM 2 and then executes the displaying sequence shown in FIG. 7. For each function, main control circuit 13 displays one of the two possible conditions: whether the selected key telephone set is registered to perform that function or whether it is not. If it is so registered, the corresponding indicator is steadily iluminated; if it is not, the corresponding indicator is not illuminated. The operating data for the selected key telephone set can therefore be easily recognized by the operator.

Figure 8:
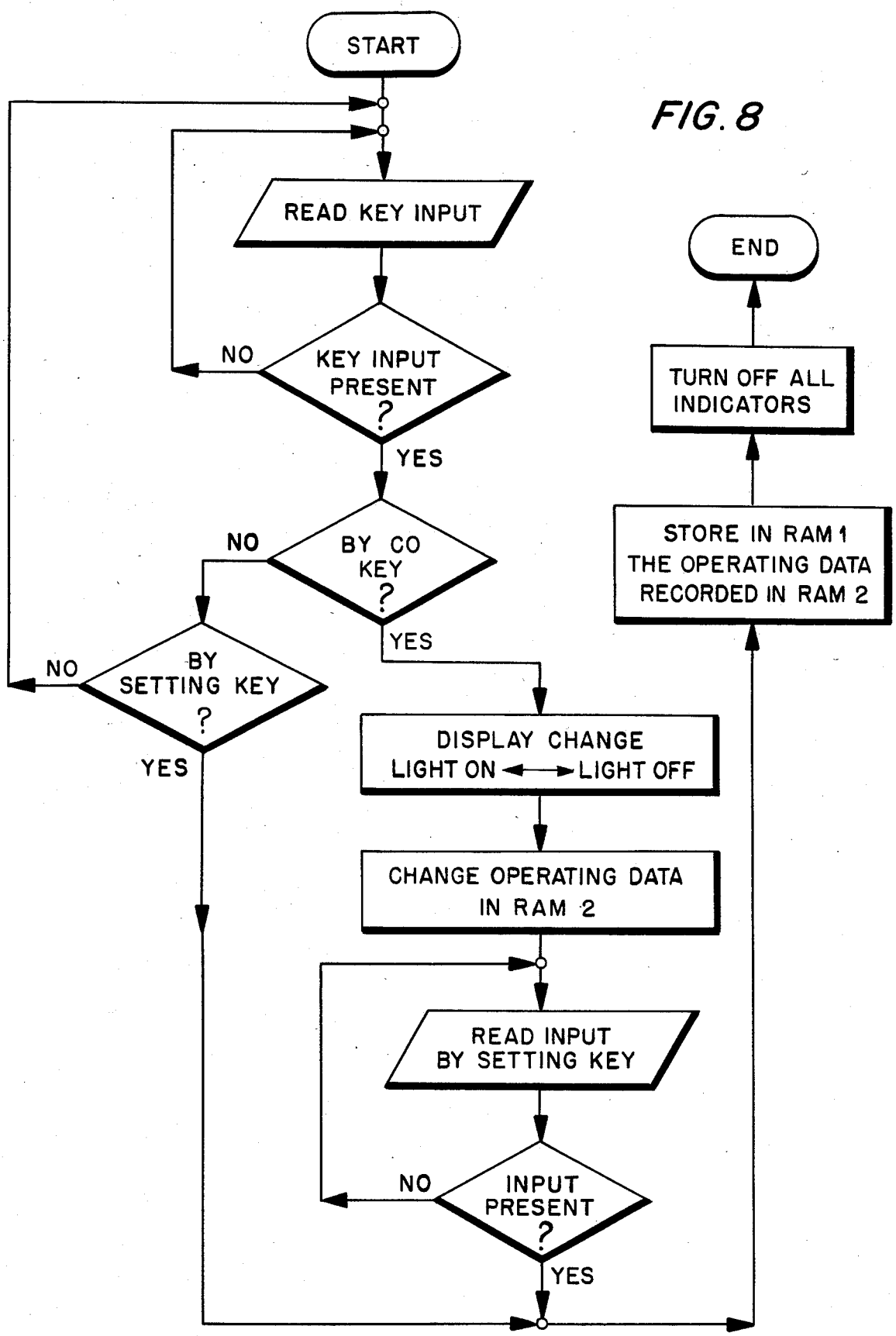

Main control circuit 13 next executes the setting sequence shown in FIG. 8. Alteration of the operating data is accomplished, once again, by means of the CO keys. If the indicator corresponding to a particular function is on, depressing the CO key once turns the indicator off and changes the data temporarily recorded in RAM 2 to indicate that the selected key telephone set is not registered for that function. Depressing the same CO key again causes the corresponding indicator to be illuminated and the operating data for that function temporarily recorded in RAM 2 to be changed to show that the selected telephone set is registered to perform the function. Further actuation of the same CO key repeats the above-mentioned action. If the indicator corresponding to the particular function is originally off, a similar sequence of events occurs.

If, then, the setting key (HOLD key) is depressed, the operating data recorded in RAM 2 is stored in RAM 1. Finally, all indicators are turned off, the setting of operating data being complete.

In the event that, following the displaying sequence, the setting key rather than any of the CO keys is depressed, the operating data recorded in RAM 2 are stored in RAM 1 in the same manner. However, since the operating data recorded in RAM 2 have not been altered, the same data is set in RAM 1 as originally existed there.

When the operator has completed setting operating data, he turns off switch $S_1$, thus switching the key telephone system to the first mode and enabling it to handle telephone calls. The system then operates using the operating data stored in RAM 1.

Using this invention, operating data can be set in a key telephone system simply and without the use of any special equipment.

In the above-described embodiment, any number of key telephone sets, including 1, may be employed. If there is only one key telephone set, of course, it may be used to set its own operating data.

Although illustrative embodiments of the invention have been described in detail with reference to the accompanying drawings, it is to be understood that the invention is not limited to those precise embodiments and that various changes and modifications may be effected therein by one skilled in the art without departing from the scope or spirit of the invention. For example, the particular keys used to change or set operating data may be any available keys on the predetermined key telephone set. No special data setting equipment is necessary, since any of the key telephone sets in the system may be chosen as the predetermined key telephone set.

Furthermore, it is not always necessary to have switches $S_1$ and $S_2$. It is also possible to perform the function of switching between the first mode and second mode or the function of transferring the reference operating data from fixed memory 15 to variable memory 14 by actuating one of the keys of the predetermined key telephone set.

We claim:

1. In a key telephone system comprising memory means for storing operating data which registers the capability of key telephone sets to perform each of a plurality of functions, and a plurality of key telephone sets each capable of performing at least one of the functions in accordance with the stored operating data, a method comprising the step of simultaneously displaying, at a predetermined one of the key telephone sets, the registered capability of a plurality of the key telephone sets to perform at least one of the functions.

2. In a key telephone system comprising first memory means for storing operating data which registers the capability of key telephone sets to perform each of a plurality of functions, second memory means for temporarily recording the operating data stored in the first memory means, and a plurality of key telephone sets each having a plurality of keys and being capable of performing at least one of the functions in accordance with the operating data stored in the first memory means, a method of setting the operating data, said method comprising the steps of:

storing the operating data in the first memory means;
recording, in the second memory means, the operating data stored in the first memory means;
simultaneously displaying, at a predetermined one of the key telephone sets, the operating data recorded in the second memory means for a plurality of the key telephone sets; and
storing, in the first memory means, the operating data recorded in the second memory means.

3. The method of claim 2 further comprising, before said final step of storing the operating data in the first memory means, the steps of:

altering the recorded operating data by actuating at least one key of the predetermined key telephone set; and
simultaneously displaying, at the predetermined key telephone set, the altered operating data for a plurality of the key telephone sets.

4. The method of claim 2 further comprising the steps of:

selecting one of the key telephone sets; and
displaying, at the predetermined one of the key telephone sets, the operating data recorded in the second memory means for the selected key telephone set.

5. The method of claim 3 wherein said step of altering the recorded operating data comprises recoverably altering the recorded operating data by actuating at least one key of the predetermined key telephone set, recovery being effected by actuating at least one key of the predetermined key telephone set.

6. In a key telephone system comprising first memory means for storing operating data, second memory means for temporarily recording the operating data stored in the first memory means, and a plurality of key telephone sets each having a plurality of keys and being capable of performing at least one of a plurality of functions in accordance with the operating data stored in the first memory means, a method of setting the operating data, said method comprising the steps of:
   storing the operating data in the first memory means;
   recording, in the second memory means, the operating data stored in the first memory means;
   simultaneously displaying, at a predetermined one of the key telephone sets, the operating data recorded in the second memory means for a plurality of the key telephone sets; and
   storing, in the first memory means, the operating data recorded in the second memory means;
   wherein said step of simultaneously displaying the operating data comprises displaying, for each function, the following conditions:
   whether all of the key telephone sets are capable of performing the function;
   whether none of the key telephone sets is capable of performing the function; or
   whether at least one but not all key telephone sets are capable of performing the function.

7. The method of claim 6 wherein the predetermined key telephone set further includes a plurality of lights, each light corresponding to a different function, the condition for each function being displayed by illuminating a light steadily, illuminating a light intermittently, or not illuminating a light.

8. In a key telephone system comprising first memory means for storing operating data, second memory means for temporarily recording the operating data stored in the first memory means, and a plurality of key telephone sets each having a plurality of keys and being capable of performing at least one of a plurality of functions in accordance with the operating data stored in the first memory means, a method of setting the operating data, said method comprising the steps of:
   storing the operating data in the first memory means;
   recording, in the second memory means, the operating data stored in the first memory means;
   simultaneously displaying, at a predetermined one of the key telephone sets, the operating data recorded in the second memory means for a plurality of the key telephone sets;
   altering the recorded operating data by actuating at least one key of the predetermined key telephone set;
   simultaneously displaying, at the predetermined key telephone set, the altered operating data for a plurality of the key telephone sets; and
   storing, in the first memory means, the operating data recorded in the second memory means;
   wherein said steps of simultaneously displaying the operating data and simultaneously displaying the altered operating data comprise displaying, for each function, the following conditions:
   whether all of the key telephone sets are capable of performing the function;
   whether none of the key telephone sets is capable of performing the function; or
   whether at least one but not all key telephone sets are capable of performing the function.

9. In a key telephone system comprising memory means for storing operating data and a plurality of key telephone sets each capable of performing at least one of a plurality of functions in accordance with the operating data, a method comprising the step of simultaneously displaying, at a predetermined one of the key telephone sets, the operating data for a plurality of the key telephone sets, said step of simultaneously displaying the operating data comprising displaying the following conditions:
   whether all of the key telephone sets are capable of performing the function;
   whether none of the key telephone sets is capable of performing the function; or
   whether at least one but not all key telephone sets are capable of performing the function.

* * * * *